(12) United States Patent
Bae (10) Patent No.: US 7,367,891 B2
(45) Date of Patent: May 6, 2008

(54) TECHNIQUES FOR CONTROLLING TRANSFER OF TORQUE USING DETENT MEMBERS RESPONSIVE TO RADIAL FORCE

(75) Inventor: Kwan-Ho Bae, Corona, CA (US)

(73) Assignee: HR Textron, Inc., Santa Clarita, CA (US)

( * ) Notice: Subject to any disclaimer, the term of this patent is extended or adjusted under 35 U.S.C. 154(b) by 204 days.

(21) Appl. No.: 10/996,171

(22) Filed: Nov. 23, 2004

(65) Prior Publication Data

US 2006/0111192 A1    May 25, 2006

(51) Int. Cl.
*F16D 7/06*    (2006.01)
*F16D 67/00*    (2006.01)

(52) U.S. Cl. ............... 464/30; 464/35; 464/37; 464/41; 192/223.2

(58) Field of Classification Search .......... 464/30, 464/35, 37, 41; 192/56.1, 55.1, 223.2, 223
See application file for complete search history.

(56) References Cited

U.S. PATENT DOCUMENTS

| 2,350,809 | A | * | 6/1944 | Pelessoni |
|---|---|---|---|---|
| 3,225,626 | A | * | 12/1965 | Geyer |
| 3,640,092 | A | * | 2/1972 | Neal et al. ............... 464/37 |
| 3,802,281 | A | * | 4/1974 | Clarke |
| 3,973,412 | A | | 8/1976 | Miles et al. ............ 64/28 R |
| 4,263,996 | A | | 4/1981 | Putney et al. .......... 192/56 R |
| 4,311,224 | A | | 1/1982 | Kato et al. ............. 192/56 R |
| 4,511,295 | A | | 4/1985 | Razdobreev et al. ...... 409/233 |
| 4,558,554 | A | | 12/1985 | Herbert et al. .......... 53/331.5 |
| 4,613,023 | A | * | 9/1986 | Fairbairn et al. ........ 192/56.1 |
| 4,639,162 | A | | 1/1987 | Geisthoff et al. ......... 403/316 |
| 4,791,841 | A | | 12/1988 | Pruvot et al. .............. 82/30 |
| 4,792,321 | A | | 12/1988 | Lundquist et al. .......... 464/35 |
| 4,901,610 | A | | 2/1990 | Larson et al. ............. 81/473 |
| 4,901,831 | A | * | 2/1990 | Ito et al. |
| 5,016,740 | A | * | 5/1991 | Ito et al. |
| 5,108,236 | A | | 4/1992 | Arai et al. ............... 409/163 |
| 5,522,605 | A | | 6/1996 | Lewis et al. .............. 279/49 |
| 5,787,743 | A | * | 8/1998 | Weigard |

(Continued)

FOREIGN PATENT DOCUMENTS

DE    15 75 735 A1    1/1970

(Continued)

*Primary Examiner*—Robert J. Sandy
*Assistant Examiner*—Victor MacArthur
(74) *Attorney, Agent, or Firm*—BainwoodHaung (57) ABSTRACT

A torque limiting device includes a base configured to reside in a fixed position relative to a drive unit, an input shaft assembly configured to receive a torque load from the drive unit, and an output shaft assembly which is capable of rotating about an axis. The torque limiting device further includes detent members disposed adjacent to the input shaft assembly and the output shaft assembly. The detent members are configured to transition the torque limiting device between (i) a drive state in which the input shaft assembly rotates the output shaft assembly about the axis and (ii) a tripped state in which the input shaft assembly does not rotate the output shaft assembly about the axis depending on forces provided to the detent members, by the input shaft assembly, in respective radial directions away from the axis and toward the base.

23 Claims, 6 Drawing Sheets

U.S. PATENT DOCUMENTS

| | | | |
|---|---|---|---|
| 5,950,774 A * | 9/1999 | Lang et al. | |
| 6,036,415 A | 3/2000 | Sheehan et al. | 409/231 |
| 6,202,803 B1 * | 3/2001 | Lang | |
| 6,206,784 B1 | 3/2001 | Kato et al. | 464/36 |
| 6,250,619 B1 | 6/2001 | Cook et al. | 269/20 |
| 6,290,241 B1 | 9/2001 | Fink et al. | 279/50 |
| 6,588,316 B1 | 7/2003 | Armitage et al. | 92/169.1 |
| 6,616,096 B1 * | 9/2003 | Witton et al. | |
| 7,037,200 B2 * | 5/2006 | Dorrie et al. | 464/35 |
| 2003/0000796 A1 * | 1/2003 | Kawai et al. | |
| 2004/0123732 A1 | 7/2004 | Lindsay et al. | 92/93 |
| 2004/0164547 A1 | 8/2004 | Cronley et al. | 285/34 |

FOREIGN PATENT DOCUMENTS

| | | |
|---|---|---|
| EP | 1 072 507 | 1/2001 |
| EP | 1 321 359 | 6/2003 |
| GB | 1 333 153 | 10/1973 |

* cited by examiner

TECHNIQUES FOR CONTROLLING TRANSFER OF TORQUE USING DETENT MEMBERS RESPONSIVE TO RADIAL FORCE

BACKGROUND

A torque limiter typically transfers torque from a power source to a driven device when the torque limiter encounters a normal torque load, but disengages the power source from the driven device when the torque limiter encounters overloading. Accordingly, such operation avoids overstressing or damaging various components such as the power source, the driven device, and the interconnecting power train linkage downstream.

One conventional torque limiter (hereinafter referred to as a conventional friction plate torque brake) includes a stator, an input shaft having rotor friction plates, and an output shaft. In response to a torque overloading event, the rotor friction plates of the input shaft drag against frictional surfaces of the stator to prevent passing further torque load onto the output shaft. As a result, the conventional friction plate torque brake avoids damaging parts downstream from the output shaft.

Another conventional torque limiter (hereinafter referred to as a conventional face gear torque brake) includes an input actuator, an output gear, and a face gear. Here, if a torque overloading event occurs, the face gear engages with the input actuator to stop the input actuator thus preventing passage of further torque load onto the output shaft.

SUMMARY

Unfortunately, there are deficiencies to the above-described conventional torque limiters. For example, in connection with the conventional friction plate torque brake, subtle interaction between frictional surfaces of the rotor friction plates and the stator results in viscous drag (i.e., resistance) that can lead to a nuisance torque brake trip. Additionally, this drag may cause considerable torque brake wear which is capable of (i) causing the torque brake to eventually exceed its initial setting as well as (ii) producing damage in downstream parts.

To avoid frequent nuisance trips of the conventional friction plate torque brake, manufacturers tend to increase the torque brake trip threshold. Unfortunately, such a change results in increased loading thus imposing a need for larger downstream parts to accommodate the larger load, e.g., an undesirable increase in the size and weight of downstream components of an aircraft.

Furthermore, in connection with the conventional face gear torque brake, the braking feature does not perform well at high rotational speeds. In particular, the face gear has difficulty engaging the actuator at high speed (e.g., in the case of a jammed condition) thus making the conventional face gear an unreliable alternative in certain situations.

In contrast to the above-described conventional torque limiters, embodiments of the invention are directed to techniques for controlling transfer of a torque load between input and output shafts configured to rotate about an axis using detent members (e.g., detent balls) which operate in response to forces provided in radial directions away from the axis. Such techniques enable implementation of certain embodiments as compact devices which fit inside limited spaces but which nevertheless provide robust and reliable torque control operation.

One embodiment of the invention is directed to a torque limiting device which includes a base configured to reside in a fixed position relative to a drive unit, an input shaft assembly configured to receive a torque load from the drive unit, and an output shaft assembly which is capable of rotating about an axis. The torque limiting device further includes detent members disposed adjacent to the input shaft assembly and the output shaft assembly. The detent members are configured to transition the torque limiting device between (i) a drive state in which the input shaft assembly rotates the output shaft assembly about the axis and (ii) a tripped state in which the input shaft assembly does not rotate the output shaft assembly about the axis depending on forces provided to the detent members, by the input shaft assembly, in respective radial directions away from the axis and toward the base.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for controlling transfer of a torque load between input and output shafts configured to rotate about a common axis using detent members (e.g., detent balls) which operate in response to forces provided in radial directions away from the axis. Such techniques enable implementation of certain embodiments as compact devices which fit inside limited spaces but which nevertheless provide robust, weight conscious and reliable torque control operation.

Figure 1:
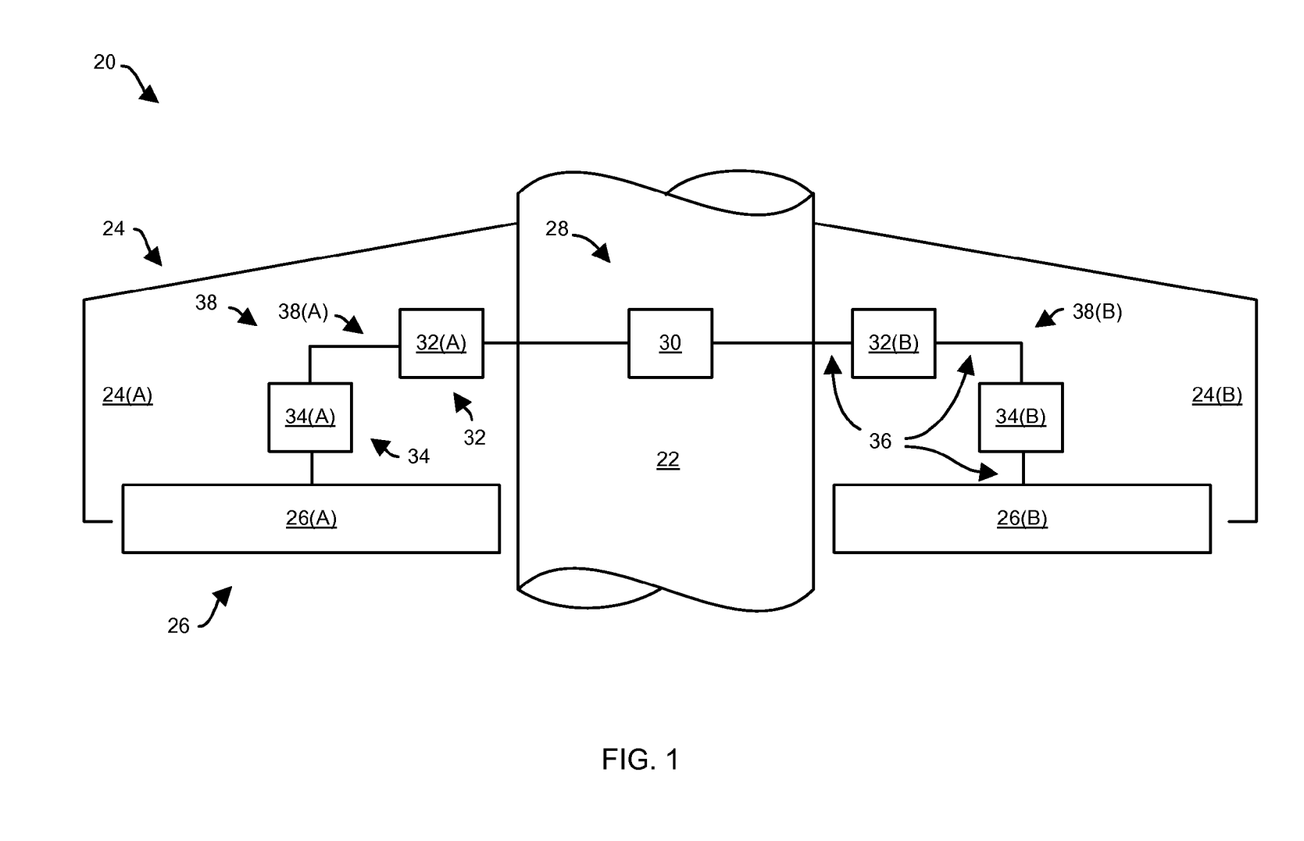
FIG. 1 is a general block diagram of an environment which is suitable for use by the invention.

FIG. 1 shows an aircraft environment 20 which is suitable for use by the invention. By way of example only, the aircraft environment 20 includes an aircraft body 22, wings 24(A), 24(B) (collectively, wings 24) and wing flaps 26(A), 26(B) (collectively, wing flaps 26). For directional control, the aircraft environment 20 further includes a drive system 28 which is configured to move the wing flaps 26. The drive system 28 includes a power drive unit 30, torque limiting devices 32(A), 32(B) (collectively, torque limiting devices 32), gear boxes 34(A), 34(B) (collectively, gear boxes 34) and linkage 36. The linkage 36 mechanically interconnects the various components of the drive system 28.

The power drive unit (PDU) 30, in combination with (i) a torque limiting device 32, (ii) an associated gear box 34 and (iii) associated linkage 36, forms a torque control system 38 for safe and reliable wing flap operation. In particular, the PDU 30, the torque limiting device 32(A), the gear box 34(A) and the associated linkage 36 forms one torque control system 38(A) for operating the wing flap 26(A). Similarly, the PDU 30, the torque limiting device 32(B), the gear box 34(B) and the associated linkage 36 forms another torque control system 38(B) for operating the wing flap 26(B).

When the drive system 28 is in operation, the common PDU 30 provides torque, and the wing flaps 26 move to provide symmetrical loading about the environment in response to that torque. Specifically, the torque control system 38(A) conveys torque from the common PDU 30 to the wing flap 26(A), and the torque control system 38(B) concurrently conveys torque from the common PDU 30 to the wing flap 26(B).

It should be understood that the torque limiting device 32(A) is configured to block the transfer of torque between the common PDU 30 and the wing flap 26(A) when the torque difference between the common PDU 30 and the wing flap 26(A) exceeds a predetermined threshold. Similarly, the torque limiting device 32(B) is configured to block the transfer of torque between the common PDU 30 and the wing flap 26(B) when the torque difference between the common PDU 30 and the wing flap 26(B) exceeds a predetermined threshold. Such torque limiting operation guarantees that the wing flaps 26 stay in safe, symmetrical alignment about the environment and that downstream components are shielded from overstressing and possible damage, even when one wing flap 26 (e.g., the wing flap 26(A)) encounters substantial torque loading while the other wing flap 26 (e.g., the wing flap 26(B)) is not exposed to that loading. As will be explained shortly, such operation utilizes radial ball detent mechanisms which are configured to transition the torque limiting device between a drive state in which that torque limiting device 32 translates torque further downstream, and a tripped state in which that torque limiting device 32 responds to a torque overloading event and does not translate torque further downstream to protect downstream components against damage. The use of such radial ball detent mechanisms enables the torque control systems 38 to enjoy a compact design and thus fit into limited spaces such as the envelope of low profile wings 24 of the aircraft environment 20. Further details of the invention will now be provided with reference to FIGS. 2 and 3.

Figure 2:
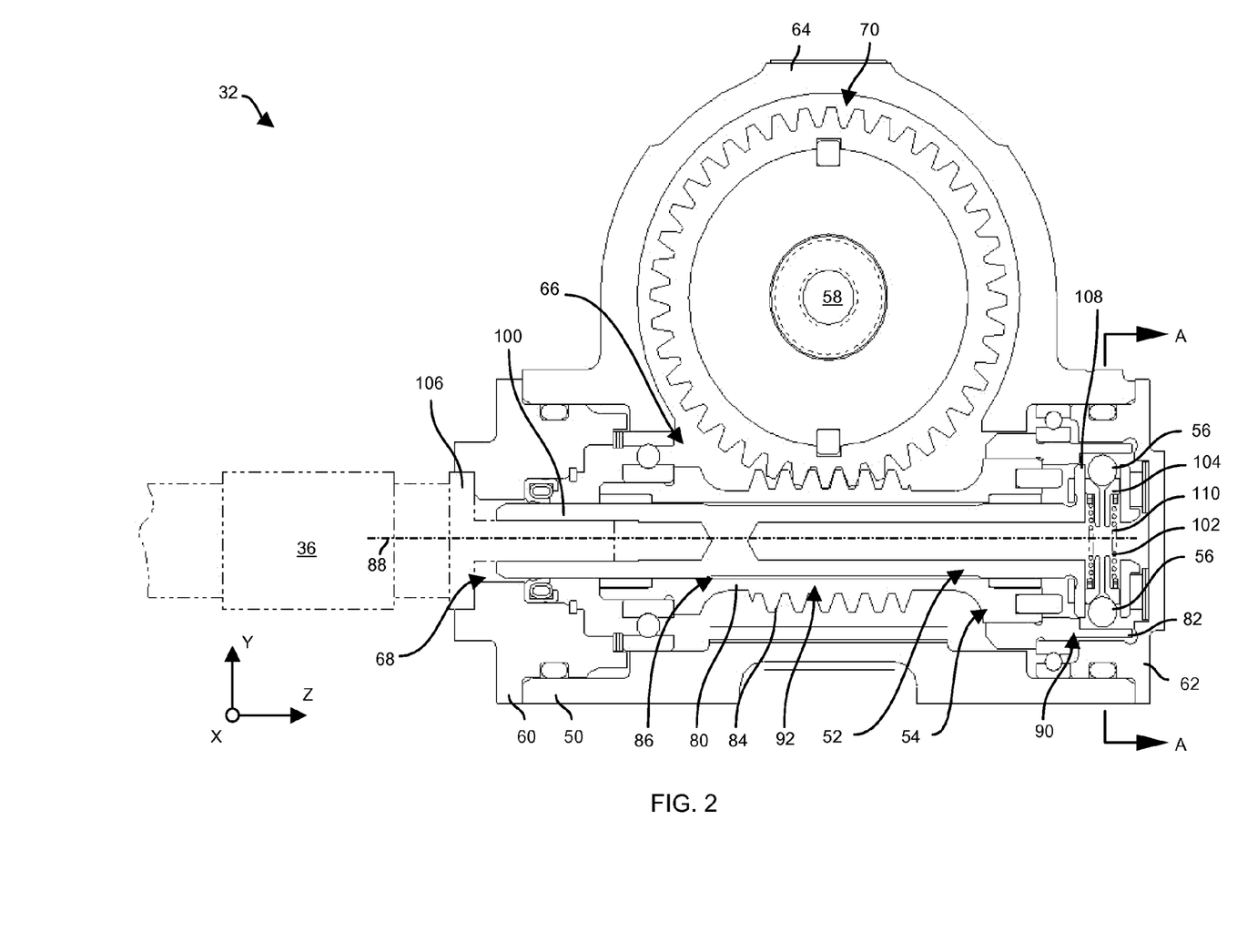
FIG. 2 is a cross-sectional side view of a torque limiting device of a torque control system of the environment of FIG. 1.
Figure 3:
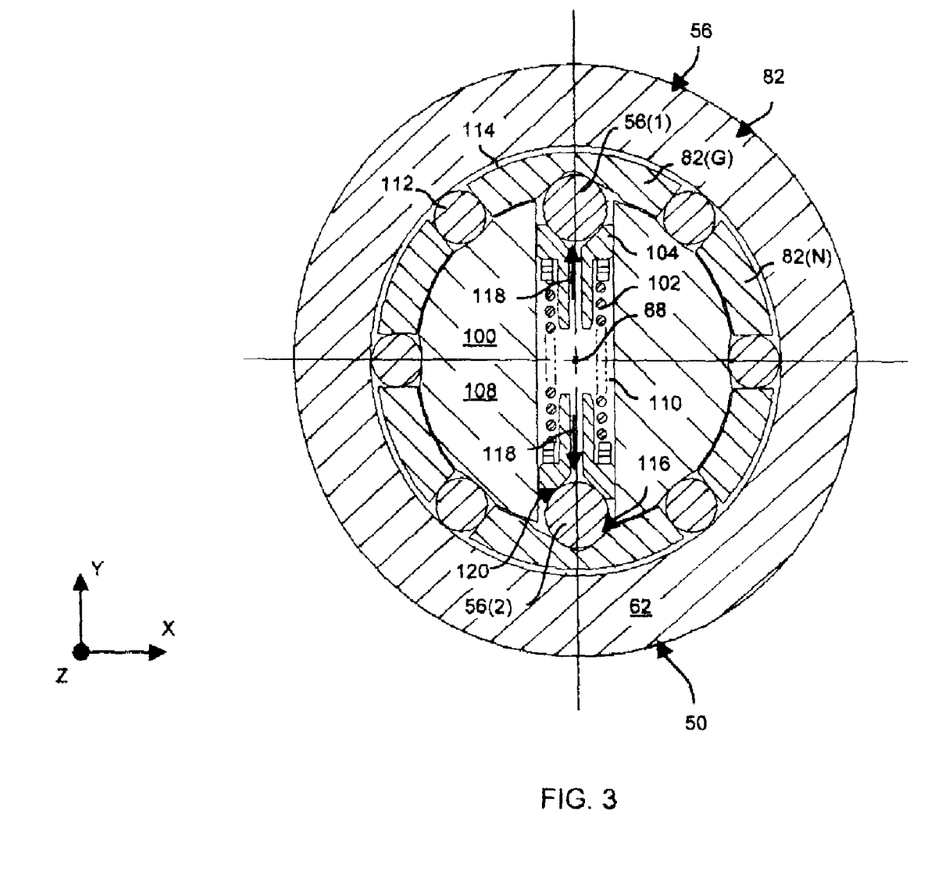
FIG. 3 is a cross-sectional axial view of a portion of the torque limiting device of FIG. 2 when in a drive state.

FIG. 2 is a cross-sectional side view of the torque limiting device 32 of each torque control system 38 (also see FIG. 1), and FIG. 3 is a cross-sectional view of a portion of the torque limiting device 32 along a cutting plane A-A in FIG. 2. As shown in FIG. 2, the torque limiting device 32 includes a base 50, an input shaft assembly 52, an output shaft assembly 54 and detent members 56. The base 50 is configured to reside in a fixed position relative to the common PDU 30 such within a limited space of an aircraft wing (FIG. 1). The input shaft assembly 52 is configured to couple to the common PDU 30 through upstream linkage 36 (shown in phantom in FIG. 2), and is configured to receive a torque load from the common PDU 30. The output shaft assembly 54 is configured to couple to an output member 58 (e.g., to downstream linkage 36, to a gear box 34, etc.), and is configured to convey torque from the input shaft assembly 52 to the output member 58. The detent members 56, i.e., a pair of detent balls 56(1), 56(2) (see FIG. 3), are disposed adjacent to the input shaft assembly 52 and the output shaft assembly 54, and are configured to control the operating state of the torque limiting device 32.

As further shown in FIG. 2, the base 50 includes a mounting portion 60 (e.g., a first gland), a retaining portion 62 (e.g., a second gland), and a housing 64 which operate together to provide a sealed enclosure which defines a chamber 66. The base 50 is configured to mount to a body (e.g., part of an aircraft wing, also see FIG. 1). The mounting portion 60 of the base 50 defines an input socket for the linkage 36 (e.g., a drive cable from the common PDU 30), and defines an area 68 of the chamber 66 which encloses sections of the input and output shaft assemblies 52, 54. The retaining portion 62 couples to the mounting portion 60, and is configured to retain and protect both (i) particular interacting portions of the input and output shaft assemblies 52, 54 and (ii) the detent members 56. The housing 64 couples to the mounting portion 60, and defines an area 70 which encloses at least a portion of the output member 58.

As shown in FIGS. 2 and 3, the output shaft assembly 54 is disposed within the chamber 66 and includes an output shaft 80, output fingers 82 and a worm gear portion 84. The output shaft 80 defines a cavity 86, and extends along an axis 88. The output fingers 82 couple to the output shaft 80 at an end 90 of the output shaft 80. The worm gear portion 84 (i.e., a threaded section) couples to a mid-section 92 of the output shaft 80.

As further shown in FIGS. 2 and 3, the input shaft assembly 52 includes an input drive shaft 100, a compression spring 102 and biasing members (or spring guides) 104. The input shaft 100 extends through the cavity 86 defined by the output shaft 80. One end 106 of the input shaft 100 is configured to receive applied torque from the common PDU 30 (FIG. 1). Another end 108 of the input shaft 100 defines a channel 110 which is substantially perpendicular to the axis 88 (FIG. 3). The spring 102 and the biasing members 104 are configured to operate within the channel 110.

In some arrangements, the torque limiting device 32 includes additional items to facilitate operation such as (i) roller bearings 112 which are interleaved with the output fingers 82 of the output shaft assembly 54 and which are annularly distributed around a portion of the input shaft 100 (FIG. 3), and (ii) a full oil film 114. Such items 112, 114 (as well as others) are configured to keep bearing wear down as the various parts of the torque limiting device 32 move relative to each other. Accordingly, the torque limiting device 32 is capable of achieving lower system stress, and enjoying less drag than conventional torque limiters such as a conventional friction plate torque brake which suffers from high drag torque and requires downstream parts to have increased size and weight to accommodate the associated increase in load.

As shown in FIG. 3, the output fingers 82 include non-grooved output fingers 82(N) and grooved output fingers 82(G). The non-grooved output fingers 82(N) are configured not to interact with detent members 56, but instead operate to cage and align the roller bearings 112. However, the grooved output fingers 82(G) define grooves 116 within which the detent members 56 interact, e.g., nestle. In particular, the compression spring 102 provides balanced radial biasing forces 118 on to the detent members 56 from the axis 88 outwardly toward the retaining portion 62 of the base 50. In one arrangement, the spring 102 is a coil spring which provides the radial biasing forces 118 in two opposing directions from the axis 88. As a result, the detent members 56, which are contained substantially within the channel 110 by alignment notches (e.g., self-alignement cones) 120 of the biasing members 104, engage the grooved output fingers 82(G) in an interlocking manner. Further details of the operation of the torque limiting device 32 will now be provided with reference to FIGS. 3 and 4.

Figure 4:
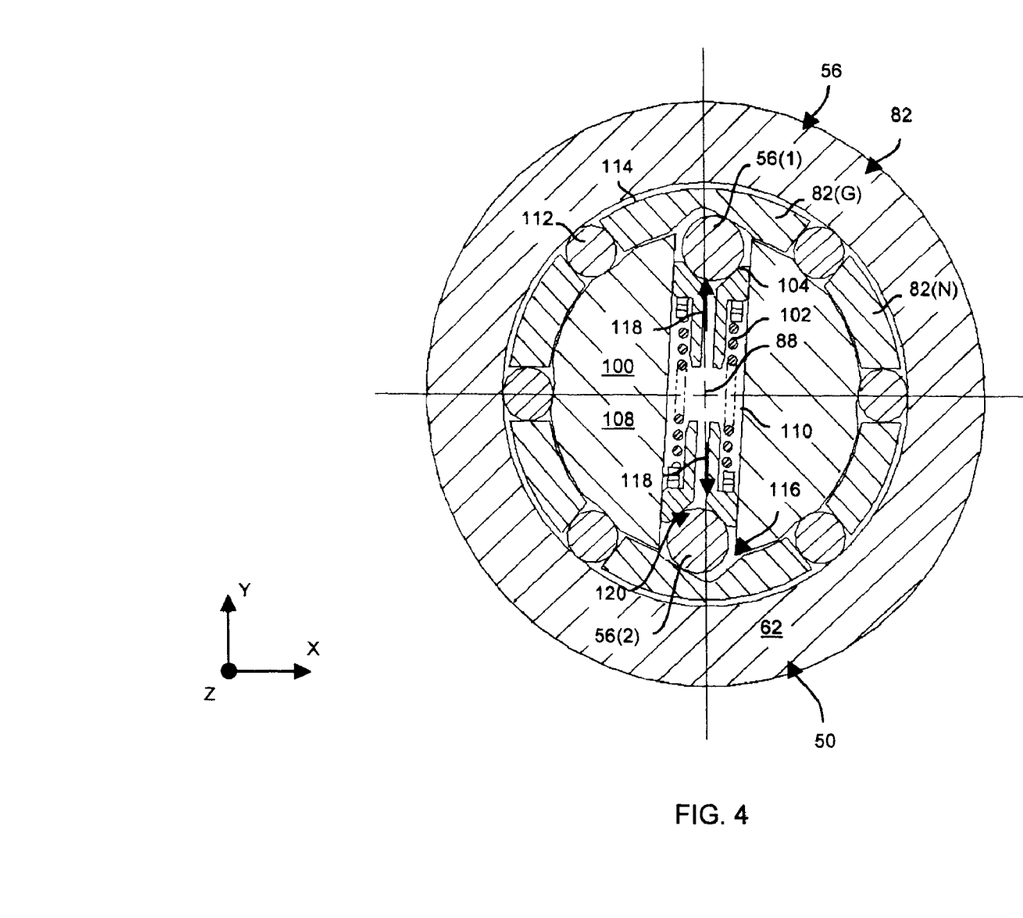
FIG. 4 is a cross-sectional axial view of the torque limiting device portion of FIG. 3 when the torque limiting device is in a tripped state.

FIG. 3 shows the torque limiting device 32 in the earlier-mentioned drive state, and FIG. 4 shows the torque limiting device 32 in the earlier-mentioned tripped state. Initially, the torque limiting device 32 begins operation in the drive state (FIG. 3). Here, the input shaft assembly 52 and the output shaft assembly 54 are configured to co-rotate in unison within the area 68 of the chamber 66 about the axis 88 in response to torque from the PDU 30 (FIG. 1). That is, as the input shaft assembly 52 rotates, the compression spring 102 biases the detent members 56 into well-nestled positions within the grooves 116 of the grooved output fingers 82(G). Accordingly, rotation of the input shaft assembly 52 about the axis 88 translates into rotation of the output shaft assembly 54 about the axis 88.

It should be understood that, although the spring 102 provides radial forces 118 to bias the detent members 56 into robust engagement with the output fingers 82(G), the radial forces 118 are reacted with the output fingers 82(G) and not the retaining portion 62 of the base when the torque limiting device 32 is in the drive state. Rather, facilitating items such as the earlier-mentioned roller bearings 112 and the oil film 114 enable the output fingers 82(G) to rotate with minimal drag. Moreover, due to the symmetrical geometry of the various shaft components, the detent members 56 are capable of efficiently translating rotation of the input shaft assembly 52 into rotation of the output shaft assembly 54 bi-directionally, i.e., either clockwise about the Z-axis in FIG. 3 or counterclockwise about the Z-axis in FIG. 3. As a result, the torque limiting device 32 enables the PDU 30 to robustly operate the output member 58 (FIG. 2) and components further downstream (e.g., a wing flap 26, also see FIG. 1) while the torque limiting device 32 is in the drive state.

FIG. 4 shows the torque limiting device 32 in the tripped state after the torque limiting device 32 has encountered a substantial torque load resulting in a significant difference between rotational orientations of the input shaft and output shaft assemblies 52, 54. Here, torque loading on the torque limiting device 32 has reached the prescribed tripping torque and displaced the input shaft assembly 52 and the output shaft assembly 54 relative to each other to the point that the input shaft assembly 52 and the output shaft assembly 54 are locked in place thus preventing translation of further input torque to components downstream. To unlock the torque limiting device, torque operation is reversed and the rollers unseat from their locking position and return to their free rolling state. Such operation protects the components downstream from damage (e.g., fatigue due to overstressing, distortion, etc.) and allows the unit to be reset in a simple manner for continued use without any need for a solenoid or similar device to disengage the device from the tripped state.

For example, suppose that a technician were to inadvertently stand on the wing flap 26(A) or place an extremely heavy object on the wing flap 26(A) thus placing a potentially damaging torque on the PDU 30 which is downstream from the wing flap 26(A) (see FIG. 1). Once the torque on the wing flap 26(A) exceeds a predetermined threshold of the torque limiting device 32, the torque limiting device 32 trips from the drive state to the tripped state. In the tripped state, the torque limiting device 32 does not convey torque to the PDU 30. Rather, the input and output shaft assemblies 52, 54 are locked into place thus protecting the PDU against potential damage and maintaining the wing flaps 26 in proper uniform alignment.

As shown in FIG. 4, as the angular alignment distance between the input shaft assembly 52 and the output shaft assembly 54 increases, the input shaft assembly 52 forces the detent members 56 against surfaces of the grooved output fingers 82(G). In particular, the detent members 56 ride away from fully nestled positions within the grooves 116. Such operation counters the outward radial forces 118 provided by the spring 102 and displaces the detent members 56 within the channel 110 toward the axis 88. As the detent members 56 move closer to each other toward the axis 88, the detent members 56 further compress the spring 102. Eventually, the spring forces 118 provided by the spring 102 exceed the inward displacement forces from the grooved output fingers 82(G) resulting in angular displacement of the grooved output fingers 82(G). This in turn forces the free state rollers 112 to move within the annular groove. The annular groove radial distance around the roller 112 closes and narrows causing the rollers to stop rolling and start skidding and inducing frictional forces. Once there is enough frictional force between both the input shaft 100 and the retaining portion 62 (which is grounded to the structure) on the rollers 112 (due to the normal and resulting frictional forces acting upon the rollers 112), the input and output shaft assemblies 52, 54 can no longer move, the input shaft 100 is grounded to the structure via the fingers and rollers thus preventing further conveyance of torque therebetween. This stopping action occurs very quickly once the tripping torque setting threshold is reached.

It should be understood that the transition of the torque limiting device 32 from the drive state to the tripped state is capable of occurring even in situations of high rotational speed. Accordingly, the torque limiting device 32 is better equipped to operate in environments which provide such high rotational speeds vis-à-vis conventional face gear torque brakes with face gears that do no engage well at high speeds. Further details of particular embodiments of the invention will now be provided with reference to FIG. 5.

Figure 5:
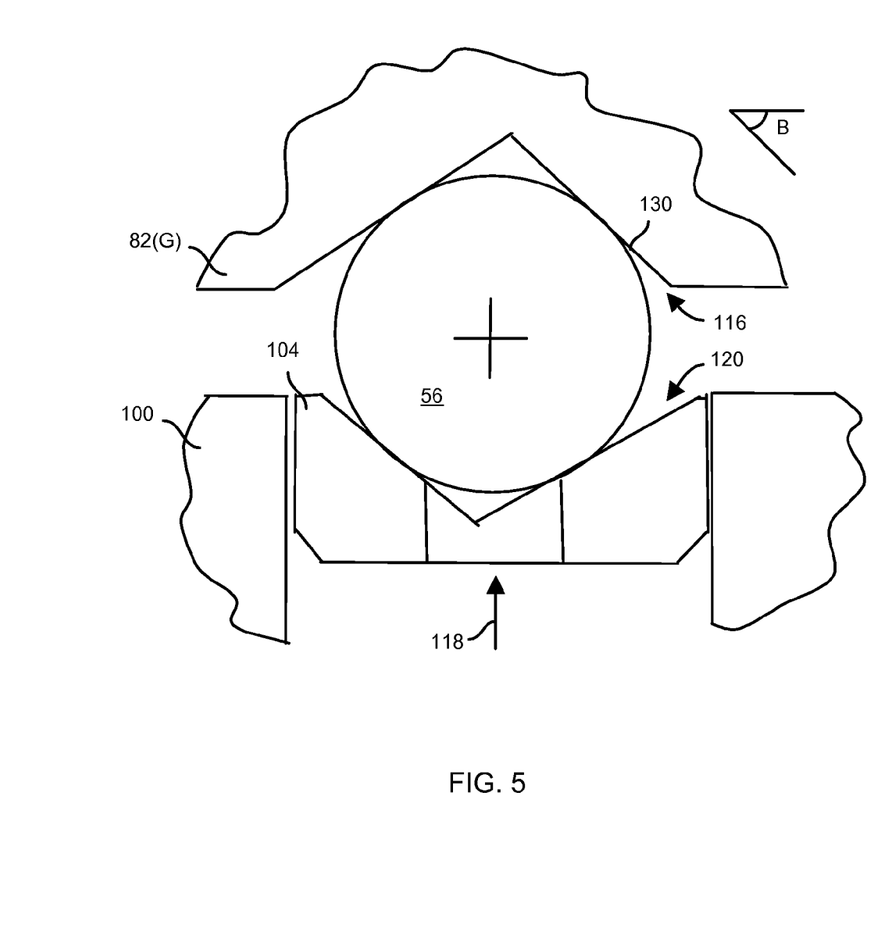
FIG. 5 is a detailed view of a detent ball of the torque limiting device portion of FIGS. 3 and 4.

FIG. 5 is a close-up view of a detent member 56 (i.e., a detent ball) while fully nestled in a groove 116 defined by a grooved output finger 82(G). When the detent member 56 is in this position, the spring 102 (FIGS. 2-4) provides radial force 118 from the axis 88 toward the biasing member 104 (also see FIG. 3). As a result, the biasing member 104 in turn pushes on the detent member 56 so that the detent member 56 fits snuggly within both the groove 116 defined by the finger 82(G) and the notch (or cup) 120 defined by the biasing member 104.

It should be understood that the predetermined trip threshold for each torque limiting device 32 is directly dependent on particular characteristics such as the geometries of the detent members 56 and the grooved output fingers 82(G). Accordingly, the manufacturer of the torque limiting devices 32 is capable of controlling the predetermined trip threshold by varying the angles B of the grooves 116. For example, a narrower groove 116 (i.e., increasing angle B) results in quicker lock-up motion for the torque limiting device 32. As a result, the dynamics of the torque limiting device 32 are easily modifiable in order to build in sufficient margin to avoid a nuisance trip. Moreover, torque brake setting is directly controllable by the spring load of the spring 102 and the angles B of the grooves 116 thus providing the manufacture with robust control over trip torque and lock-up torque values.

It should be understood that input torque is constant for both directions of rotation, spring bias load is constant, and trip torque load can vary by changing the angle of the ramps depending on the design requirements. In one arrangement, the trip torque and lock-up torque values are set to be relatively close, and the lock-up torque value is set low for extremely quick lock-up motion. Accordingly, components downstream of the torque limiting device 32 can be designed smaller and lighter to take advantage of lower system stress. Further details of the invention will now be provided with reference to FIGS. 6 and 7.

Figure 6:
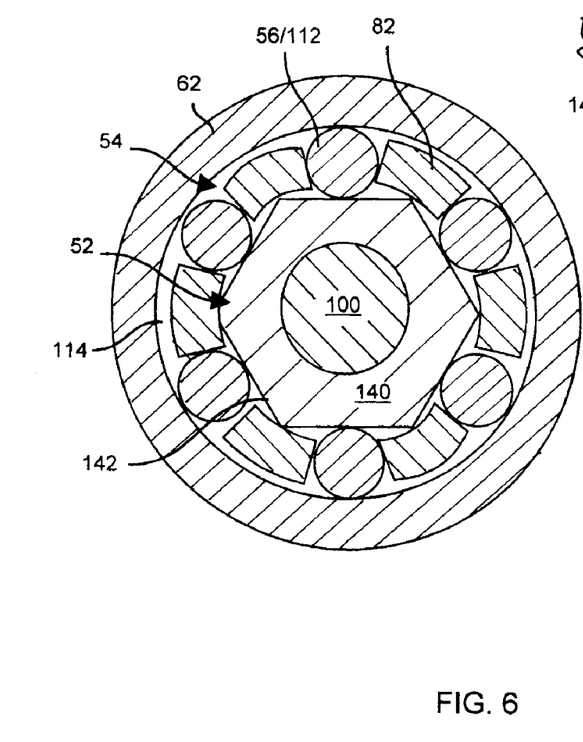
FIG. 6 is a cross-sectional axial view of an arrangement for particular components which are alternative to those shown in FIGS. 3-4.
Figure 7:
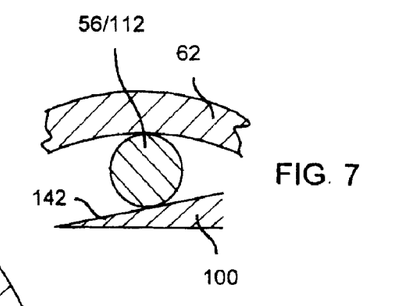
FIG. 7 is a detailed view of a portion of FIG. 6.

FIGS. 6 and 7 are high-level pictorial representations of the crowding of the rollers, thereby going from a rolling action to a skidding action. The triggering device has been omitted from FIG. 6 for clarity of the definition. By way of example, the input shaft assembly 52 simply includes an input shaft 100 with a symmetrically-shaped end 140 having substantially flat sides 142 (e.g., a hexagonally shaped end). Additionally, the roller bearings 112 operate as the detent members 56, and all of the output fingers 82 are non-grooved. This hexagonal shape preferably uses more angular displacement between the two concentric shafts for effective torque limiting operation.

In this arrangement, the input shaft 100 of the input shaft assembly 52 rotates in response to torque. Frictional engagement of the input shaft 100 with the output fingers 82 results in conveyance of that torque to the output shaft assembly 54. The bearing members 54 and oil film 114 facilitate smooth and concurrent rotation of the input shaft assembly 52 and the output shaft assembly 54.

However, if the angular distance between the input shaft assembly 52 and the output shaft assembly 54 increases beyond a predetermined threshold (e.g., if the input shaft assembly 52 and the output shaft assembly 54 rotate in opposite directions), the sides 142 crowd the roller bearings 112 against the retaining portion 62 of the base 50. Accordingly, the input shaft 100 wedges into a locked position and is no longer capable of rotating. As a result, the torque limiting device 32 prevents further conveyance of torque downstream.

FIG. 7 shows the interaction between a side 142 of the input shaft 100, the retaining portion 62 of the base 50, and a roller bearing 112. This arrangement causes the torque limiting device 32 to operate essentially as a roller ramp torque brake. That is, the torque limiting device 32 protects downstream components (e.g., actuators) in case of a jam during operation.

As shown in FIG. 7, it should be clear that the roller bearing 112 interferes with further rotation of the input shaft 100. In particular, the torque difference between the input shaft assembly 52 and the output shaft assembly 54 pins the roller bearing 112 against the retaining portion 62 of the base 50. Thus, the input shaft 100 is incapable of further rotation.

As mentioned above, embodiments of the invention are directed to techniques for controlling transfer of a torque load between input and output shaft assemblies 52, 54 configured to rotate about an axis 88 using detent members 56 (e.g., detent balls) which operate in response to forces 118 provided in radial directions away from the axis 88. Such techniques enable implementation of certain embodiments as compact devices which fit inside limited spaces but which nevertheless provide robust and reliable torque control operation.

While this invention has been particularly shown and described with references to preferred embodiments thereof, it will be understood by those skilled in the art that various changes in form and details may be made therein without departing from the spirit and scope of the invention as defined by the appended claims.

For example, the torque limiting device 32 was described above as being well-suited for operating within an aircraft environment 20 to control wing flaps 26 by way of example only. It should be understood that the torque limiting device 32 is well-suited for operating within other environments (and operating other components) as well such as land and water vehicles, construction machinery, manufacturing and industrial equipment, and the like.

What is claimed is:

1. A torque control system, comprising:
   a drive unit;
   an output member; and
   a torque limiting device interconnected between the drive unit and the output member, the torque limiting device including:
      a base configured to reside on a stationary member so that the base remains in a fixed position relative to the drive unit,
      an output shaft assembly including an output shaft defining a cavity and extending longitudinally along a rotational axis, the output shaft being constructed and arranged to convey torque from the drive unit to the output member and including one or more output fingers supported at one end of the shaft;
      an input shaft assembly including an input drive shaft extending through the cavity defined by the output shaft and having one end coupled to the drive unit and configured to receive a torque load from the drive unit, the input shaft rotating about the same rotational axis as the output shaft during operation,
      detent members disposed adjacent to the input shaft assembly and the output shaft assembly, the detent members being configured to transition the torque limiting device between (i) a drive state in which the input shaft assembly, as driven by the drive unit, rotates the output shaft assembly about the axis and (ii) a tripped state in which the input shaft assembly does not rotate the output shaft assembly about the axis depending on forces provided to the detent members, by the input shaft assembly, in respective radial directions away from the axis and toward the base, and
      wherein in use the input shaft frictionally engages the output fingers so as to convey torque to the output shaft assembly and cause concurrent rotation of the input shaft assembly and the output shaft assembly, and wherein when the torque difference between the input shaft assembly and the output shaft assembly is above a predetermined threshold, the sides of the second end of the input shaft force the detent members in a radial direction away from the rotational axis and into engagement with the base so as to wedge the input shaft into a non-rotating position to stop the transference of torque from the input shaft.

2. The torque control system of claim 1 wherein the detent members of the torque limiting device are configured to (i) permit rotation of the input shaft assembly about the axis when the torque limiting device is in the drive state and (ii) prevent rotation of the input shaft assembly about the axis when the detent members transition the torque limiting device from the drive state to the tripped state.

3. The torque control system of claim 2 wherein the base of the torque limiting device includes a retaining portion which extends around both a portion of the input shaft assembly and a portion of the output shaft assembly, and wherein the detent members include:
   detent balls which are disposed adjacent the portions of the input shaft and output shaft assemblies, the input shaft assembly being configured to provide (i) a non-binding amount of force on the portion of the output shaft assembly toward the retaining portion of the base to enable both the input shaft assembly and the output shaft assembly to rotate about the axis when the torque limiting device is in the drive state and (ii) a binding amount of force on the portion of the output shaft assembly toward the retaining portion of the base to prevent both the input shaft assembly and the output shaft assembly from rotate about the axis when the torque limiting device is in the drive state when the torque limiting device is in the tripped state.

4. The torque control system of claim 3 wherein the portion of the output shaft assembly includes:
   output fingers defining grooves; and
   wherein the portion of the input shaft assembly includes:
      an input shaft defining a channel, and
      a spring disposed within the channel that biases the detent balls into engagement with the output fingers at the grooves defined by the output fingers.

5. The torque control system of claim 4 wherein the non-binding and binding amounts of force provided by the input shaft assembly are defined, at least in part, by a compression force of the spring applied to the detent balls and groove angles for the grooves defined by the output fingers.

6. The torque control system of claim 1, wherein, the input shaft is configured to frictionally engage the output fingers via the detent members.

7. A torque limiting device, comprising:
   a base configured to reside on a stationary member so that the base remains in a fixed position relative to a drive unit;
   an output shaft assembly including an output shaft defining a cavity and extending longitudinally along a rotational axis, the output shaft being constructed and arranged to convey torque from a drive unit to an output member and including one or more output fingers supported at one end of the shaft;
   an input shaft assembly including an input shaft portion extending through the cavity defined by the output shaft and including one end constructed and arranged to receive a torque load from the drive unit and a second end having a symmetrical polygonal shape including substantially flat sides, wherein the input shaft rotates about the same rotational axis as the output shaft during operation; and
   detent members disposed adjacent to the input shaft assembly and the output shaft assembly, the detent members being configured to transition the torque limiting device between (i) a drive state in which the input shaft assembly, as driven by the drive unit, rotates the output shaft assembly about the axis and (ii) a tripped state in which the input shaft assembly does not rotate the output shaft assembly about the axis depending on forces provided to the detent members, by the input shaft assembly, in respective radial directions away from the axis and toward the base; and
   wherein in use the input shaft frictionally engages the output fingers so as to convey torque to the output shaft assembly and cause concurrent rotation of the input shaft assembly and the output shaft assembly, and wherein when the torque difference between the input shaft assembly and the output shaft assembly is above a predetermined threshold, the sides of the second end of the input shaft force the detent members in a radial direction away from the rotational axis and into engagement with the base so as to wedge the input shaft into a non-rotating position to stop the transference of torque from the input shaft.

8. The torque limiting device of claim 7 wherein the detent members are configured to (i) permit rotation of the input shaft assembly about the axis when the torque limiting device is in the drive state and (ii) prevent rotation of the input shaft assembly about the axis when the detent members transition the torque limiting device from the drive state to the tripped state.

9. The torque limiting device of claim 8 wherein the base includes a retaining portion which extends around both a portion of the input shaft assembly and a portion of the output shaft assembly, and wherein the detent members include:
   roller bearings which are disposed adjacent the retaining portion of the base and the portions of the input shaft and output shaft assemblies, the input shaft assembly being configured to (i) rotate the roller bearings against the retaining portion of the base when the torque limiting device is in the drive state and (ii) wedge the roller bearings against the retaining portion of the base to lock the portions of the input shaft and output shaft assemblies relative to the retaining portion of the base when the torque limiting device is in the tripped state.

10. The torque limiting device of claim 8 wherein the base includes a retaining portion which extends around both a portion of the input shaft assembly and a portion of the output shaft assembly, and wherein the detent members include:
   detent balls which are disposed adjacent the portions of the input shaft and output shaft assemblies, the input shaft assembly being configured to provide (i) a non-binding amount of force on the portion of the output shaft assembly toward the retaining portion of the base to enable both the input shaft assembly and the output shaft assembly to rotate about the axis when the torque limiting device is in the drive state and (ii) a binding amount of force on the portion of the output shaft assembly toward the retaining portion of the base to prevent both the input shaft assembly and the output shaft assembly from rotate about the axis when the torque limiting device is in the drive state when the torque limiting device is in the tripped state.

11. The torque limiting device of claim 10 wherein the portion of the output shaft assembly includes:
   output fingers defining grooves; and
   wherein the portion of the input shaft assembly includes:
      an input shaft defining a channel, and
      a spring disposed within the channel that biases the detent balls into engagement with the output fingers at the grooves defined by the output fingers.

12. The torque limiting device of claim 11 wherein the non-binding and binding amounts of force provided by the input shaft assembly are defined, at least in part, by a compression force of the spring applied to the detent balls and groove angles for the grooves defined by the output fingers.

13. The torque limiting device of claim 11, further comprising:
   roller bearings which are interleaved with the output fingers of the output shaft assembly and which are annularly distributed around a portion of the input shaft.

14. The torque limiting device of claim 7 wherein the input shaft assembly includes:
   the input shaft portion, and
   an input linkage portion;

wherein the output shaft assembly includes:
the output shaft which defines a cavity, and
output fingers which couple to the output shaft;
wherein the input shaft portion resides within the cavity defined by the output shaft; and
wherein the detent members link the output fingers of the output shaft assembly to the input linkage portion of the input shaft assembly.

15. The torque limiting device of claim 14 wherein the output shaft assembly further includes:
a worm gear portion which encircles the output shaft, the worm gear portion being configured to engage an output gear.

16. The torque limiting device of claim 7 wherein the input shaft assembly includes:
an input shaft defining a channel, and
a spring disposed within the channel that provides the forces to the detent members in the respective radial directions away from the axis and toward the base.

17. The torque limiting device of claim 16 wherein the output shaft assembly is configured to displace the detent members toward the spring in response to an increase in rotational distance between the input shaft assembly and the output shaft assembly, wherein displacement of the detent members toward the spring compresses the spring to increase the forces provided to the detent members, and wherein the torque limiting device is configured to transition from the drive state to the tripped state when amounts of force provided the spring result in wedging of the detent members and the output shaft assembly to the base due to friction.

18. The torque limiting device of claim 17 wherein the axis passes through the spring, and wherein the spring provides the forces to the detent members in directions which are substantially perpendicular to the axis.

19. The torque limiting device of claim 18 wherein the detent members include:
a pair of detent balls, and wherein the spring provides a first force in a first direction to one of the pair of detent balls and a second force in a second direction to another of the pair of detent balls, the first direction being substantially opposite the second direction to bias the detent balls away from each other.

20. The torque limiting device of claim 19 wherein the base includes:
a mounting portion configured to mount to a body in communication with the drive unit; and
a retaining portion coupled to the mounting portion, the retaining portion defining a rotational chamber within which are disposed (i) the pair of detent balls, (ii) a portion of the input shaft assembly, and (iii) a portion of the output shaft assembly, and wherein both the portion of the input shaft assembly and the portion of the output shaft assembly are configured to coaxially rotate within the retaining portion of the base when the torque limiting device is in the drive state.

21. The torque limiting device of claim 7 wherein the base includes a mounting portion, a retaining portion, and a housing which together define a chamber constructed and arranged to provide an enclosure for the torque limiting device.

22. The torque limiting device of claim 7 wherein the second end of the input shaft has a generally hexagonal shape.

23. A torque limiting device, comprising:
a base configured to reside on a stationary member so that the base remains in a fixed position relative to a drive unit;
an output shaft assembly including an output shaft defining a cavity and extending longitudinally along a rotational axis, the output shaft being constructed and arranged to convey torque from a drive unit to an output member and including one or more output fingers supported at one end of the shaft;
an input shaft assembly including an input drive shaft extending through the cavity defined by the output shaft and having one end configured to receive a torque load from the drive unit, the input shaft rotating about the same rotational axis as the output shaft during operation;
means for transitioning the torque limiting device between (i) a drive state in which the input shaft assembly, as driven by the drive unit, rotates the output shaft assembly about the axis and (ii) a tripped state in which the input shaft assembly does not rotate the output shaft assembly about the axis depending on forces provided to the detent members, by the input shaft assembly, in respective radial directions away from the axis and toward the base; and
wherein in use the input shaft frictionally engages the output fingers so as to convey torque to the output shaft assembly and cause concurrent rotation of the input shaft assembly and the output shaft assembly, and wherein when the torque difference between the input shaft assembly and the output shaft assembly is above a predetermined threshold, the sides of the second end of the input shaft force the detent members in a radial direction away from the rotational axis and into engagement with the base so as to wedge the input shaft into a non-rotating position to stop the transference of torque from the input shaft.

* * * * *